US012772032B2

(12) United States Patent
Yang

(10) Patent No.: US 12,772,032 B2
(45) Date of Patent: Oct. 20, 2026

(54) DATA TRANSMISSION METHOD AND APPARATUS, TERMINAL DEVICE AND NETWORK TERMINAL

(71) Applicant: GUANGDONG OPPO MOBILE TELECOMMUNICATIONS CORP., LTD., Dongguan (CN)

(72) Inventor: Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 340 days.

(21) Appl. No.: 18/539,737

(22) Filed: Dec. 14, 2023

(65) Prior Publication Data

US 2024/0129706 A1 Apr. 18, 2024

Related U.S. Application Data

(63) Continuation of application No. PCT/CN2021/106620, filed on Jul. 15, 2021.

(51) Int. Cl.

*H04W 8/00* (2009.01)
*H04W 48/18* (2009.01)
*H04W 76/14* (2018.01)
*H04W 92/18* (2009.01)

(52) U.S. Cl.

CPC ........... *H04W 8/005* (2013.01); *H04W 48/18* (2013.01); *H04W 76/14* (2018.02); *H04W 92/18* (2013.01)

(58) Field of Classification Search

CPC ..... H04W 76/14; H04W 40/22; H04W 48/18; H04W 8/005; H04W 76/12; H04W 88/04; H04W 92/18

See application file for complete search history.

(56) References Cited

U.S. PATENT DOCUMENTS

2018/0279195 A1 9/2018 Kim et al.
2019/0335332 A1 10/2019 Ying et al.
2022/0095398 A1* 3/2022 Pan ........................ H04W 76/14
2022/0330193 A1* 10/2022 Shan ..................... H04W 8/005
2022/0330361 A1 10/2022 Ding et al.

(Continued)

FOREIGN PATENT DOCUMENTS

CN 112752240 A 5/2021
EP 4072234 A1 10/2022

(Continued)

OTHER PUBLICATIONS

CATT et al: "TS 23.304: Procedure on Layer-3 UE-to-Network Relay without N3IWF", 3GPP Draft; S2-2104949, 3rd Generation Partnership Project (3GPP), Mobile Competence Centre; 650, Route Des Lucioles ; F-06921 Sophia-Antipolis Cedex; France vol. SA WG2, No. e-meeting; May 17, 2021May 28, 2021, May 31, 2021 (May 31, 2021), XP052018142, the whole document, 5 pages.

(Continued)

*Primary Examiner* — Andrew Lee

(74) *Attorney, Agent, or Firm* — BAYES PLLC

(57) ABSTRACT

A data transmission method and apparatus, a terminal device and a network device are provided. The method comprises: a first terminal determines a protocol data unit (PDU) session type; and the first terminal relays data between a (Continued)

network device and a second terminal on the basis of a PDU session corresponding to the PDU session type.

14 Claims, 7 Drawing Sheets

(56) References Cited

U.S. PATENT DOCUMENTS

| | | | | |
|---|---|---|---|---|
| 2022/0338000 | A1* | 10/2022 | Lee | H04W 12/71 |
| 2023/0319556 | A1* | 10/2023 | Wu | H04L 9/0869 |
| 2023/0328532 | A1* | 10/2023 | Wang | H04W 12/50 455/410 |
| 2023/0354085 | A1* | 11/2023 | Deng | H04W 76/11 |
| 2023/0370902 | A1* | 11/2023 | Wang | H04W 28/0268 |
| 2024/0098628 | A1* | 3/2024 | Fu | H04W 8/02 |
| 2024/0196206 | A1* | 6/2024 | Fu | G06F 21/602 |

FOREIGN PATENT DOCUMENTS

| | | | |
|---|---|---|---|
| WO | 2021056573 | A1 | 4/2021 |
| WO | 2021135295 | A1 | 7/2021 |

OTHER PUBLICATIONS

"3rd Generation Partnership Project; Technical Specification Group Services and System Aspects; Study on system enhancement for Proximity based Services(Prose) in the 5G System (5GS) (Release17)", 3GPP Draft; SP-210101. ZIP23752-DIFF_V100-V200; 650, Route Des Lucioles ; F-06921 Sophia-Antipolis Cedex; France, Mar. 16, 2021 (Mar. 16, 2021), XP051988116, paragraph [6.6.1]-paragraph [6.6.3], paragraph [6.35.2.3]-paragraph [6.35.3], paragraph [6.40.2]-paragraph [6.41].

Supplementary European Search Report in the European application No. 21949687.4, mailed on Jun. 13, 2024, 10 pages.

International Search Report in the international application No. PCT/CN2021/106620, mailed on Mar. 18, 2022. 7 pages with English translation.

Written Opinion of the International Search Authority in the international application No. PCT/CN2021/106620, mailed on Mar. 18, 2022. 8 pages with English translation.

SA WG2 Meeting #144E e-meeting S2-2102879, Apr. 12-Apr. 16, 2021, Elbonia, Source: Qualcomm Incorporated, Title: TS 23.304: clause 5.4.1 Layer-3 UE-to-Network Relay, Document for: Approval, Agenda Item: 8.8. section 2. 2 pages.

3GPP TSG-SA/WG2 Meeting #142e S2-2008373 (revision of S2-200xxxx), Elbonia, Nov. 16-20, 2020, Source: Intel, Title: KI#3, Conclusion Update on PDU Session related aspect, Document for: Agreement, Agenda Item: 8.8. section 8.3. 4 pages.

3GPP TS 23.304 V0.3.0 (May 2021), 3rd Generation Partnership Project; Technical Specification Group Services and System Aspects; Proximity based Services (ProSe) in the 5G System (5GS) (Release 17). section 5.1-5.5. 90 pages.

3GPP TS 23.304 V1.0.0 (Jun. 2021), 3rd Generation Partnership Project; Technical Specification Group Services and System Aspects; Proximity based Services (ProSe) in the 5G System (5GS) (Release 17). the whole document. 90 pages.

Decision of Rejection of the Chinese application No. 202180099619.0, issued on Aug. 1, 2025.

First Office Action of the European application No. 21949687.4, issued on Apr. 4, 2025. 6 pages.

First Office Action of the Chinese application No. 202180099619.0, issued on Jan. 22, 2025. 18 pages with English translation.

Second Office Action of the Chinese application No. 202180099619.0, issued on Mar. 26, 2025. 19 pages with English translation.

Notice of oral proceedings of the European application No. 21949687.4, issued on Jun. 17, 2026.

* cited by examiner

DATA TRANSMISSION METHOD AND APPARATUS, TERMINAL DEVICE AND NETWORK TERMINAL

CROSS-REFERENCE TO RELATED APPLICATION

This application is a continuation of International Patent Application No. PCT/CN2021/106620, filed on Jul. 15, 2021, which is hereby incorporated by reference in its entirety.

BACKGROUND

With the continuous development of the fifth generation (5G) applications, Network Controlled Interactive Services (NCIS) has been introduced into the standards as a new service form for related standardized services.

NCIS services are mainly aimed at applications such as Augmented Reality (AR)/Virtual Reality (VR), and games, which have high requirements for service quality such as speed, delay, packet loss rate, high-speed codec. The session established for NCIS services is an NCIS session, and the user equipment (UE) in the same NCIS session may be considered as forming an NCIS group, for example, teaming in games.

In the 3rd Generation Partnership Project (3GPP) R17, 5G proximity service (ProSe) is used for communication in short-range services. ProSe contains NCIS. An important scenario of Prose is the UE-to-network (U2N) relay scenario. In the U2N relay scenario, data is relayed through a relay UE to a remote UE, so that the remote UE can communicate with the network.

In the related art, there is a case that the relay UE cannot correspond data for the remote UE to the correct Protocol Data Unit (PDU) session, resulting in data transmission failure.

SUMMARY

Embodiments of the present disclosure provide a data transmission method and apparatus, a terminal device and a network device.

In a first aspect, there is provided a data transmission method, including: determining, by a first terminal, a protocol data unit (PDU) session type; and relaying, by the first terminal, data between a second terminal and a network device based on a PDU session corresponding to the PDU session type.

In a second aspect, there is provided a data transmission apparatus, including a memory used to store a computer program, and a processor used to invoke and run the computer program stored in the memory to perform: determining a protocol data unit (PDU) session type; and relaying data between a network device and a second terminal based on a PDU session corresponding to the PDU session type.

In a third aspect, there is provided a data transmission apparatus, including a memory used to store a computer program, and a processor used to invoke and run the computer program stored in the memory to perform: configuring a first mapping rule for a first terminal; the first mapping rule being used to indicate protocol data unit (PDU) session parameters, PDU session type information in the PDU session parameters being used for the first terminal to determine a PDU session type, and a first relay service code (RSC) corresponding to the first mapping rule being an RSC corresponding to the second terminal, wherein the first mapping rule indicates correspondences between the first RSC and the PDU session parameters.

BRIEF DESCRIPTION OF THE DRAWINGS

The drawings described herein are used to provide a further understanding of the present disclosure and form a part of the present disclosure. The schematic embodiments of the present disclosure and the description thereof are used to explain the present disclosure and do not constitute an improper limitation of the present disclosure. In the drawings.

DETAILED DESCRIPTION

The technical solutions in embodiments of the present disclosure will be described below in combination with the drawings in embodiments of the present disclosure. It is apparent that the described embodiments are not all embodiments but part of embodiments of the present disclosure. All other embodiments obtained by those of ordinary skill in the art based on embodiments in the present disclosure without creative work shall fall within the scope of protection of the present disclosure.

Figure 1:
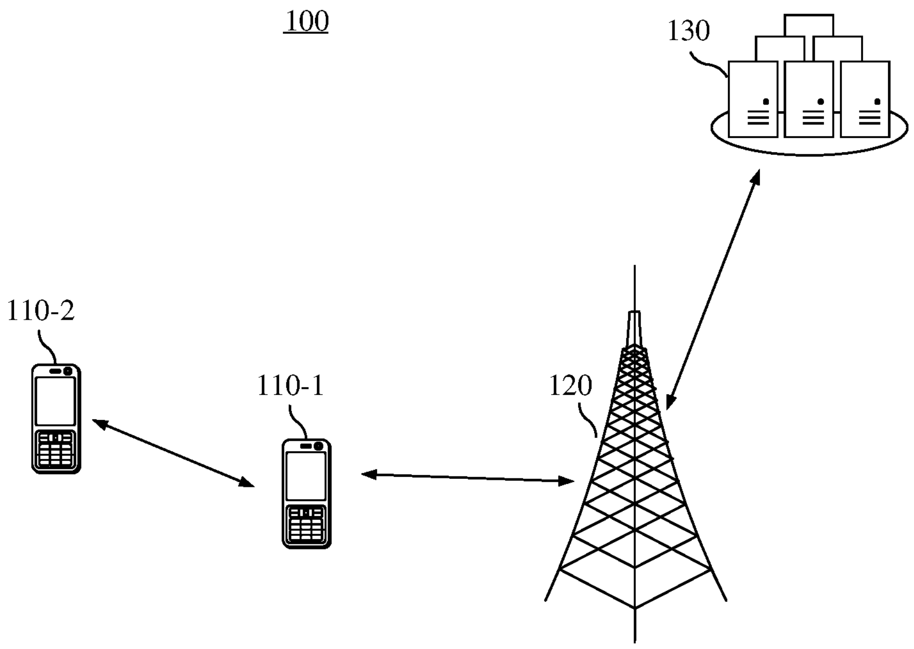
FIG. 1 is an optional schematic diagram of an application scenario of an embodiment of the present disclosure.

FIG. 1 is a schematic diagram of an application scenario of an embodiment of the present disclosure.

As shown in FIG. 1, the communication system 110 may include a terminal device 110 (including a terminal device 110-1 and a terminal device 110-2) and a network device 120. The network device 120 may communicate with the terminal device 110-1 through an air interface. Multi-service transmission is supported between the terminal device 110-1 and the network device 120. The terminal device 110-2 communicates with the network device 120 through the terminal device 110-1. Here, the terminal device 110-1 is referred to as a relay UE and the terminal device 110-2 is referred to as a remote UE.

It is to be understood that embodiments of the present disclosure are illustrative only with the communication system 100 but are not limited thereto. That is, the technical solutions of embodiments of the present disclosure may be applied to various communication systems, such as: Long Term Evolution (LTE) system, LTE Time Division Duplex (TDD), Universal Mobile Telecommunication System (UMTS), Internet of Things (IoT) system, Narrow Band Internet of Things (NB-IoT) system, enhanced Machine-Type Communications (eMTC) system, 5G communication system (also referred to as New Radio (NR) communication system), or future communication system, etc.

In the communication system 100 shown in FIG. 1, the network device 120 may be an access network device that communicates with the terminal device 110. The access network device may provide communication coverage for a specific geographic area and may communicate with the terminal device 110 (e.g. UE) located within this coverage area.

The network device 120 may be an Evolutional Node B (eNB or eNodeB) in an LTE system, or a Next Generation Radio Access Network (NG RAN) device, or a base station in a NR system (gNB), or a radio controller in a Cloud Radio Access Network (CRAN), or the network device 120 may be a relay station, an access point, a vehicle-mounted device, a wearable device, a hub, a switch, a bridge, a router, a network device in a future evolved Public Land Mobile Network (PLMN), and the like.

The terminal device 110 may be any terminal device, including but not limited to a terminal device in wired or wireless connection with the network device 120 or other terminal devices.

For example, the terminal device 110 may refer to an access terminal, a UE, a user unit, a user station, a mobile station, a mobile terminal, a remote station, a remote terminal, a mobile device, a user terminal, a terminal, a wireless communication device, a user agent, or a user apparatus. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved network or the like.

The terminal device 110 may be used for Device to Device (D2D) communication. The wireless communication system 100 may also include a core network device 130 that communicates with a base station, the core network device 130 may be a 5G Core (5GC) device, for example, with an Access and Mobility Management Function (AMF); for another example, with an Authentication Server Function (AUSF); for another example, with a User Plane Function (UPF); and for another example, with a Session Management Function (SMF). In an example, the core network device 130 may also be an Evolved Packet Core (EPC) device of the LTE network, for example, a Session Management Function+Core Packet Gateway (SMF+PGW-C) device. It is to be understood that SMF+PGW-C may achieve the functions of SMF and PGW-C at the same time. In the process of network evolution, the above core network device may also be referred by other names, or a new network entity may be formed by dividing the functions of the core network, which is not limited by embodiments of the present disclosure.

Various functional units in the communication system 100 may also establish a connection through a next generation (NG) interface to realize communication.

For example, the terminal device establishes an air interface connection with the access network device through a Uu interface for transmitting user plane data and control plane signaling. The terminal device may establish a control plane signaling connection with the AMF through an NG interface 1 (N1 for short). The access network device such as a next generation radio access base station (gNB) may establish a user plane data connection with the UPF through an NG interface 3 (N3 for short). The access network device may establish a control plane signaling connection with the AMF through an NG interface 2 (N2 for short). The UPF may establish a control plane signaling connection with the SMF through an NG interface 4 (N4 for short). The UPF may interact user plane data with data network through an NG interface 6 (N6 for short). The AMF may establish a control plane signaling connection with the SMF through an NG interface 11 (N11 for short). The SMF may establish a control plane signaling connection with the PCF through an NG Interface 7 (N7 for short).

FIG. 1 exemplarily illustrates one base station, one core network device and two terminal devices. In an example, the wireless communication system 100 may include multiple base station devices and another number of terminal devices may be included within the coverage of each base station, which is not limited in embodiments of the present disclosure.

It is to be noted that FIG. 1 only illustrates the system to which the present disclosure applies by way of example and of course, the method shown in embodiments of the present disclosure may also be applicable to other systems. In addition, terms “system” and “network” in the present disclosure may usually be exchanged. In the present disclosure, the term “and/or” is only an association relationship describing associated objects and represents that three relationships may exist. For example, A and/or B may represent three conditions: i.e., independent existence of A, existence of both A and B and independent existence of B. In addition, character “/” in the present disclosure usually represents that previous and next associated objects form an “or” relationship. It is also to be understood that the reference to “indication” in embodiments of the present disclosure may be a direct indication, may be an indirect indication, or may be indicative of an association. For example, A indicates B, which may represent that A directly indicates B, for example, B may be obtained through A. It may also represent that A indirectly indicates B, for example, A indicates C, and B may be obtained through C. It may also represent that there is an association between A and B. It should also be understood that, “correspond” referred to in embodiments of the present disclosure may represent that there are direct correspondences or indirect correspondences between the two, may also represent that there are association between the two, may also be a relationship between indication and being indicated, configuring and being configured, etc. It should also be understood that, “predefined” or “predefined rules” referred to in embodiments of the present disclosure may be implemented by pre-storing respective codes, tables, or other means for indicating relevant information in a device (e.g., including a terminal device and a network device), the specific implementation of which is not limited in the present disclosure. For example, predefined may refer to what is defined in the protocol. It should also be understood that, in embodiments of the present disclosure, the “protocol” may refer to standard protocols in the communication field, such as LTE protocol, NR protocol, and related protocols applied in future communication systems, which are not limited in the present disclosure.

In order to facilitate understanding of the technical solutions of embodiments of the present disclosure, the related arts of embodiments of the present disclosure are described below, and the following related arts may be arbitrarily combined with the technical solutions of embodiments of the present disclosure as an optional solution, all of which belong to the protection scope of embodiments of the present disclosure.

Figure 2:
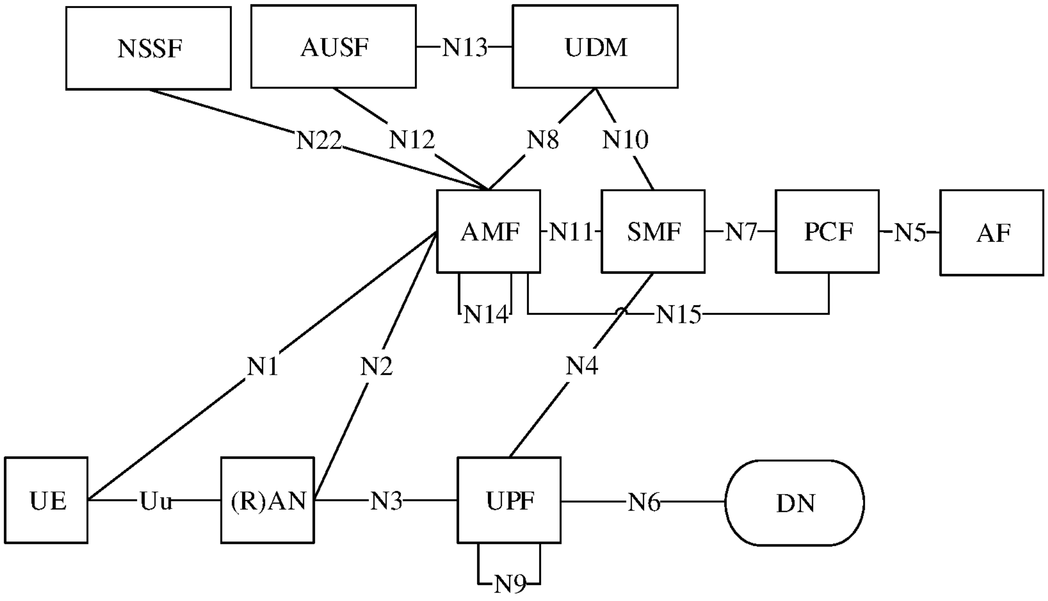
FIG. 2 is an optional architecture schematic diagram of a 5G communication system of an embodiment of the present disclosure.

The network architecture of the 5G communication system is shown in FIG. 2, which includes: AMF, SMF, Policy Control Function, Authentication Server Function (AUSF), Unified Data Management (UDM), UPF, Network SliceSelection Function (NSSF) and Application Function (AF).

Further, the network architecture also includes an Access Network (AN)/a Radio Access Network (RAN) device, a UE, and a data network (DN). The UE may be connected to the AMF, and the AN/RAN may also be connected to the AMF. The AN/RAN may also be connected to the UPF, the UPF may be connected to the SMF and the DN respectively. The AMF may be connected to the SMF, the UDM, the PCF, the NSSF and the AUSF respectively. The SMF may be connected to the PCF and the UDM respectively. The PCF is connected to the AF. Both the AMF and the SMF may obtain data from the UDM, such as user subscription data, and both the AMF and the SMF may obtain policy data from the PCF. For example, the PCF obtains the user subscription data from the UDM and sends it to the AMF and the SMF, and then the user subscription data is sent by the AMF and the SMF to the AN/RAN, the UE, the UPF and the like.

The AMF is mainly used for terminal device registration, mobility management and tracking area update process in mobile network. The mobility management network element terminates a non-access stratum (NAS) message; completes registration management, connection management, and reachability management; allocates a track area list (TA list) and mobility management, etc., and transparently routes session management (SM) messages to the session management network element. Here, in the 4th generation (4G) communication, the AMF may be replaced by a Mobility Management Entity (MME), and in future communication such as the 6th generation (6G) communication, the AMF may still be an AMF or a network element with another name that supports the mobility management function, which is not limited in the present disclosure.

The SMF is mainly used for session management in mobile networks, such as session creation, modification and release. Specific functions include, for example, assigning internet protocol (IP) addresses to users, selecting user plane network elements that provide message forwarding function, etc. In 4G, the SMF may be replaced by a Packet Data Network GateWay (PGW). In future communications such as 6G, the SMF may still be an SMF or a network element with another name that supports the session management function, which is not limited in the present disclosure.

The PCF contains a user subscription data management function, a policy control function, a billing policy control function, a QoS control and so on. In 4G, the PCF may be replaced by a policy and charging rules function (PCRF). In future communications such as 6G, the PCF may still be a PCF or a network element with another name that supports the policy control function, which is not limited in the present disclosure.

The AUSF is mainly used to use the extensible authentication protocol (EAP) to verify the service function and store the key to achieve the authentication and authentication of users. In 4G, the AUSF may be replaced by an authentication, authorization, accounting server (AAA) server. In future communications such as 6G, the AUSF may still be an AUSF or a network element with another name that supports authentication functions, which is not limited in the present disclosure.

The UDM is mainly used to store user data, such as subscription information and authentication/authorization information. In 4G, the UDM may be replaced by a Home subscriber Server (HSS). In future communications such as 6G, the UDM may still be a UDM or a network element with another name that supports that data management function, which is not limited in the present disclosure.

The UPF is mainly used for service processing in user plane, such as service routing, packet forwarding, anchoring function, QoS mapping and execution, uplink identification and routing to data network, downlink packet cache and notification trigger of downlink data arrival, connection with external data network, etc. In 4G, the UPF may be replaced by the user plane of PGW of Packet Data Network GateWay (PGW). In future communications such as 6G, the UPF may still be a UPF or a network element with another name that supports the user plane function, which is not limited in the present disclosure.

The (R)AN is a device providing wireless communication function for terminal device, including but not limited to: next generation base station (gnodeB, gNB), evolved node B (eNB), radio network controller (RNC), node B (NB), base station controller (BSC), base transceiver station (BTS), home base station (for example, home evolved nodeB, or homenode B, HNB), baseBand unit (BBU), transmitting and receiving point (TRP), transmitting point (TP), the mobile switching center, and so on in 5G.

The UE is a device with wireless transceiver function, which may be deployed on land, including indoor or outdoor, hand-held or vehicle-mounted; may be deployed on the water (such as ships, etc.); may also be deployed in the air (such as airplanes, balloons and satellites, etc.). The terminal device may be a mobile phone, a pad, a computer with wireless transceiver function, a VR terminal, an AR terminal, a wireless terminal in industrial control, a wireless terminal in self driving, a wireless terminal in remote medical, a wireless terminal in smart grid, a wireless terminal in transportation security, a wireless terminal in smart city, a wireless terminal in smart home, etc.

The DN is mainly used to provide services for users, such as operators' services, Internet access services and third-party services.

The core network (CN) provides an interface to DN as a bearer network, providing communication connection, authentication, management, communication and data service bearer for terminal device. In the network architecture shown in FIG. 2, the core network functions are divided into a user plane function and a control plane function. The user plane function is mainly responsible for data packet forwarding, QoS control and so on. The control plane function is mainly responsible for user registration and authentication, mobility management, sending data packet forwarding strategy to the UPF, or QoS control strategy, etc. Here, the control plane function mainly includes an AMF and the SMF network element, etc. Specifically, the AMF network element is responsible for the registration process of user access, location management during user movement, paging of terminal device and so on. The SMF network element is responsible for establishing a respective session connection at a core network side when the user initiates the service and providing specific services for the user. In 5G, the CN may be a 5G core network (5GC).

As shown in FIG. 2, interfaces and connections in the network architecture may include: Uu, N1, N2, N3, N4, N5, N6, N7, N8, N10, N11, N12, N13, N14, N15, N22. Here, Uu is an interface between the terminal device and the RAN. N1 is a control plane interface between the terminal device and the AMF network element, which is used to transmit the control signaling between the user device and a control plane of the core network. The message in the specific N1 connection may be transmitted by the connection between the terminal device and the RAN and the N2 connection between the RAN and the AMF network element. N2 is a control plane interface between the RAN and the AMF network element. N3 is an interface between the RAN and a user plane function. N4 is an interface between the SMF network element and the user plane function, and is used to transfer the control signaling between the SMF network element and the user plane function. N5 is an interface between the PCF and the AF. N6 is an interface between the user plane function and the DN. N7 is an interface between the SMF network element and the PCF. N8 is an interface between the AMF network element and the UDM network element. N10 is an interface between the UDM network element and the SMF network element. N11 is an interface between the AMF network element and the SMF network element. N12 is an interface between the AUSF network element and the AMF network element. N13 is an interface between the AUSF network element and the UDM. N14 is an interface for the AMF. N15 is an interface between the AMF network element and the PCF network element. N22 is an interface between the NSSF network element and the AMF network element.

Figure 3:
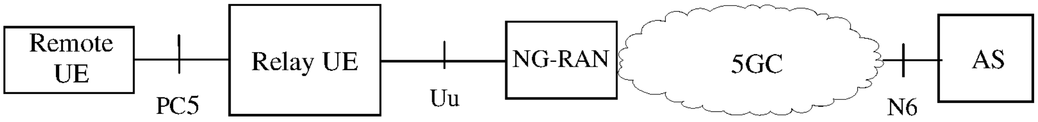
FIG. 3 is an optional schematic diagram of a composition structure of a communication system of an embodiment of the present disclosure.

As shown in FIG. 3, when a UE not only has the ability to connect to an external data network through a 5G network, but also has ProSe capability, this UE may act as a relay UE. Another remote UE with ProSe capability may establish a direct link with the relay UE through a PC5 interface, establish a PDU session with a 5G network (including NG-RAN and 5GC) through the relay UE, and interact with an Application Service (AS) of the external network through the established PDU session.

A PC5 link is established between the remote UE and the relay UE, and the relay UE uses the PDU session to relay the data of the remote UE for the remote UE. Since each PDU session has a type, for example: Internet Protocol version 4 (IPv4), IPv6, IPv4v6, Ethernet, Unstructured. Only data using this type may be transferred using the corresponding PDU session.

In order to achieve relay communication, the relay UE and the remote UE need to obtain necessary mapping rules before the relay communication. These mapping rules may come from the PCF, an application server, and are pre-configured on the terminal, or in a Subscriber Identity Module (SIM) card.

There is a mapping relationship between a RSC and PDU session parameters in these mapping rules. For example: RSC←→PDU session type information, Single-Network Slice Selection Assistance Information (S-NSSAI), Data Network Name (DNN), session and service continuity (SSC) mode, and so on.

Before transmitting data, the remote UE needs to discover an appropriate relay UE and establish a PC5 connection with it.

Figure 4:
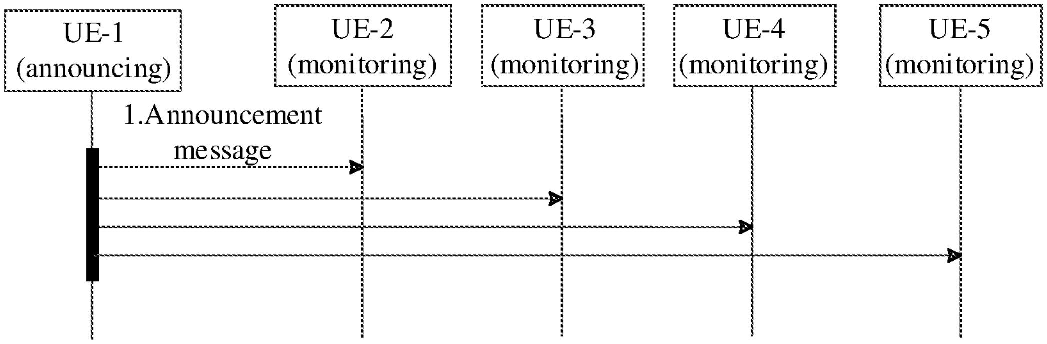
FIG. 4 is an optional flowchart of relay discovery of an embodiment of the present disclosure.
Figure 5:
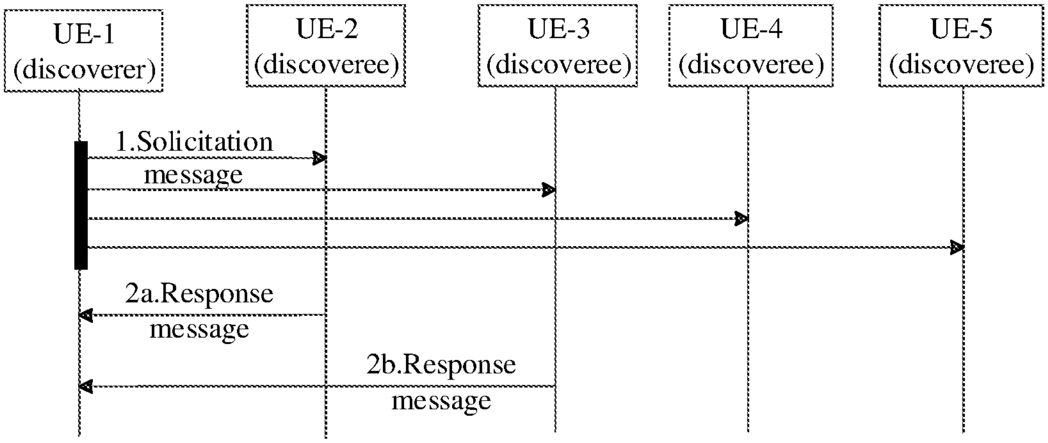
FIG. 5 is an optional flowchart of relay discovery of an embodiment of the present disclosure.

Relay discovery for the remote UE to discover the relay UE may have Model A shown in FIG. 4 or Model B shown in FIG. 5.

As shown in FIG. 4, UE-1 is a relay UE actively announcing an announcement message, here the announcement message carries an RSC that the relay UE may provide relay services. UE-2, UE-3, UE-4 and UE-5 monitor the RSC announced by UE-1.

As shown in FIG. 5, UE-1 is a remote UE. UE-1, as a discoverer, first issues RSC required by itself, while UE-2, UE-3, UE-4 and UE-5, each as a discovereree, monitors the RSC sent by UE-1. UEs supporting the RSC: UE-2 and UE-3, which are relay UEs. The relay UE replies to the remote UE.

After the discovery process, the relay UE establishes a PC5 connection with a remote UE.

In related art, in the mapping relationship of the PDU session parameters corresponding to the RSC, each of the PDU session parameters is optional, so the PDU session parameters may not contain PDU session type. If so, the relay UE cannot correspond data of the remote UE to the correct PDU session, resulting in data transmission failure.

In order to facilitate understanding of the technical solutions of embodiments of the present disclosure, the technical solutions of the present disclosure are described in detail below by way of specific embodiments. The above related arts may be arbitrarily combined with the technical solutions of embodiments of the present disclosure as an optional solution, all of which belong to the protection scope of embodiments of the present disclosure. Embodiments of the present disclosure include at least parts of the following.

Figure 6:
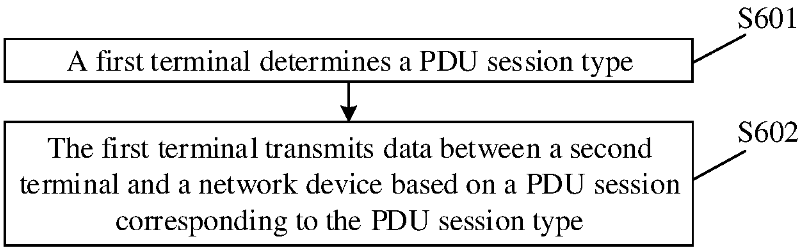
FIG. 6 is an optional flowchart of a data transmission method of an embodiment of the present disclosure.

An embodiment of the present disclosure provides a data transmission method, as shown in FIG. 6, includes the following.

In S601, a first terminal determines a PDU session type.

In S602, the first terminal transmits data between a second terminal based on a PDU session corresponding to the PDU session type.

In an example, the second terminal is a remote terminal, the first terminal is a relay terminal between the remote terminal and the network device, and messages between the second terminal and the network device are relayed by the first terminal.

In an example, before S601, the first terminal and the second terminal perform relay discovery. The RSC corresponding to the second terminal is a first RSC, the second terminal may support the first RSC, and the first RSC corresponds to services required by the second terminal. Here, the relay discovery performed by the first terminal and the second terminal may be Model A shown in FIG. 4 or Model B shown in FIG. 5. Embodiments of the present disclosure do not limit the relay discovery process performed by the first terminal and the second terminal.

In some embodiments, in S601, the first terminal determining the PDU session type includes the following.

The first terminal determines the PDU session type based at least on a first mapping rule corresponding to a first RSC, and the first RSC is an RSC corresponding to the second terminal.

The first terminal is configured with at least one mapping rule. RSCs corresponding to different mapping rules are different, and for different mapping rules, types of information included in PDU session parameters are the same or different.

In an example, the first terminal determines the first RSC corresponding to the second terminal and determines the first mapping rule based on the first RSC.

In an example, the mapping rules of the first terminal include: a mapping rule A corresponding to RSC1, a mapping rule B corresponding to RSC2. The first mapping rule is mapping rule A when the first RSC is RSC 1.

In some embodiments, the first mapping rule is configured by a network device for the first terminal; the first mapping rule is pre-configured by the first terminal; or the first mapping rule is pre-stored by the first terminal.

In an example, the network device includes: a PCF or an application server.

In an example, the pre-configured is pre-configured in the first terminal.

In an example, the pre-stored location may be a SIM card of the first terminal.

In some embodiments, the first terminal determines the first RSC based on a first message sent by the second terminal.

In an example, before S601, the first terminal receives the first message sent by the second terminal and determines the first mapping rule based on the first RSC carried in the received first message.

In some embodiments, the first message includes one of:

a direct link establishment request, which is used for the second terminal to request the first terminal to establish a direct link; and a security mode completion message, which is used for the second terminal to indicate that a current security mode of the first terminal has been established.

In some embodiments, the first mapping rule indicates correspondences between the first RSC and the PDU session parameters.

The mapping rules indicate the correspondences between the RSC and the PDU session parameters. Here, a relationship indicating correspondences between the first RSC and the PDU session parameters is defined as the first mapping rule.

In some embodiments, the PDU session parameters indicated by the first mapping rule are used to determine the PDU session type.

The PDU session parameters include at least one of: PDU session type information, a single network slice selection assistance information (S-NSSAI), a data network name (DNN), or a session and service continuity (SSC) mode, and the like.

In an embodiment of the present disclosure, the first terminal determines the PDU session type based at least on the first mapping rule corresponding to the first RSC includes the following.

In a first determining mode, the PDU session type is determined based on the PDU session type information in the PDU session parameters.

In a second determining mode, the PDU session type is determined based on a PDU type and at least on one of the following information in the PDU session parameters: S-NSSAI, DNN and SSC mode.

In the first determining mode, the PDU session includes: PDU session type information. At this time, the first terminal determining the PDU session type based at least on the first mapping rule corresponding to the first RSC includes: the first terminal determines the PDU session type based on the PDU session type information.

In an example, the PDU session type information in the PDU session parameters is a required parameter.

In an example, the PDU session type information in the PDU session parameters is an optional parameter.

It is to be noted that when the PDU session type information in the PDU session parameters is not specified as an optional parameter, it may be understood that the PDU session type information in the PDU session parameters is a required parameter.

When the PDU session parameters include the PDU session type information, the first terminal determines the PDU session type indicated by the PDU session type information.

In some embodiments, the PDU session type information indicates one PDU session type.

In some embodiments, the first mapping rule is the same as a second mapping rule, and the second mapping rule is a mapping rule for the second terminal and corresponds to the first RSC.

Here, the RSC indicated by the first mapping rule is the first RSC, which is the same as the RSC indicated by the second mapping rule, and the PDU session parameters indicated by the first mapping rule are the same as the PDU session parameters indicated by the second mapping rule. That is, the correspondences indicated by the first mapping rule are the same as the mapping relationship indicated by the second mapping rule.

The first mapping rule is the mapping rule for the first terminal, and the second mapping rule is the mapping rule for the second terminal.

In an example, the first mapping rule and the second mapping rule are configured in the same way.

In an example, the first mapping rule is configured by the network device for the first terminal, and the second mapping rule is configured by the network device for the second terminal.

In an example, the first mapping rule is pre-configured by the first terminal and the second mapping rule is pre-configured by the second terminal.

In an example, the first mapping rule is pre-stored by the first terminal and the second mapping rule is pre-stored by the second terminal.

In an example, the first mapping rule and the second mapping rule are configured in different ways.

In an example, the first mapping rule is configured by the network device for the first terminal, and the second mapping rule is pre-configured by the second terminal.

In an example, the first mapping rule is pre-configured by the first terminal and the second mapping rule is pre-stored by the second terminal.

In the case that the first mapping rule is configured by the network device, the first terminal receives the first mapping rule configured by the network device.

Figure 7:
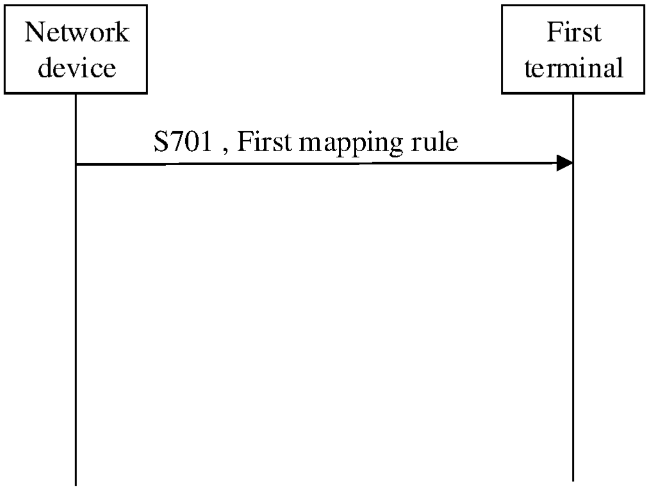
FIG. 7 is an optional flowchart of the data transmission method of an embodiment of the present disclosure.

An embodiment of the present disclosure further provides a data transmission method, as shown in FIG. 7, includes the following.

S701, a network device configures a first mapping rule for a first terminal.

The first mapping rule is used to indicate PDU session parameters, PDU session type information in the PDU session parameters is used for the first terminal to determine a PDU session type, a PDU session corresponding to the PDU session type is used to transmit data between the first terminal and a second terminal, and a first RSC corresponding to the first mapping rule is an RSC corresponding to the second terminal.

In some embodiments, the network device configures a second mapping rule for the second terminal.

In some embodiments, the PDU session parameters further include at least one of: S-NSSAI, DNN and SSC mode.

In the second determining mode, the first terminal determining the PDU session type based at least on the first mapping rule corresponding to the first RSC includes: the first terminal determines the PDU session type based on the PDU type and at least one of the following information in the PDU session parameters: S-NSSAI, DNN and SSC mode.

In an example, when the PDU session parameters do not include the PDU session type information, the first terminal determines the PDU session type based on the PDU type and at least one of: S-NSSAI, DNN and SSC mode.

In an example, the first terminal determines the PDU session type based on the PDU type and S-NSSAI.

In an example, the first terminal determines the PDU session type based on the PDU type, S-NSSAI, DNN, and SSC mode.

In the second determining mode, the obtaining mode of the PDU type includes:

first obtaining mode, the first terminal determines the PDU type based on a first message sent by the second terminal; and second obtaining mode, the first terminal determines the PDU type based on the PDU type used by an upper layer of the first terminal.

In the first obtaining mode, the source of the PDU is the second terminal. The first terminal receives the first message sent by the second terminal, and the first message is used to indicate the PDU type. In an example, the PDU type indicated by the first message is a PDU type determined by the second terminal.

In the second obtaining mode, the source of the PDU is the upper layer of the first terminal. The upper layer may be an application layer. The first terminal determines the PDU type based on the PDU type used by the upper layer.

In practical application, when the first terminal receives the first message sent by the second terminal and the PDU type is carried by the first message, the first terminal uses the PDU type sent by the second terminal, and when the PDU type is not carried in the first message, the PDU type used by the upper layer is used.

In some embodiments, the first message includes one of:

a direct link establishment request; or a security mode completion message.

In the second determining mode, the configuring modes of the first mapping rule and the second mapping rule may be the same or different.

In an example, the first mapping rule is configured by the network device and the second mapping rule is pre-stored.

In an example, the first mapping rule is configured by the network device and the second mapping rule is configured by the network device.

Optionally, the PDU session parameters of the first mapping rule include the PDU session information, and the PDU session parameters of the second mapping rule include the PDU session information.

Optionally, the PDU session parameters of the first mapping rule do not include the PDU session information, and the PDU session parameters of the second mapping rule do not include the PDU session information.

In some embodiments, before S601, the first terminal further performs the following steps.

The first terminal receives the direct link establishment request. The direct link establishment request carries or does not carry the first RSC sent by the second terminal.

Figure 8:
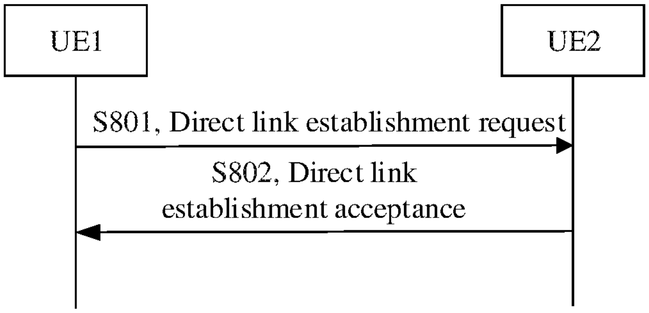
FIG. 8 is an optional flowchart of the data transmission method of an embodiment of the present disclosure.

At this time, the interaction between the first terminal and the second terminal, as shown in FIG. 8, includes the following.

In S801, a second terminal sends a direct link establishment request to a first terminal.

At this time, the first terminal receives the direct link establishment request sent by the second terminal.

In S802, the first terminal sends a direct link establishment acceptance message to the second terminal.

In some embodiments, in response to the first RSC having no security requirement, the direct link establishment request carries the first RSC; or in response to the first RSC having a security requirement, the direct link establishment request does not carry the first RSC.

In some embodiments, in response to the direct link establishment request not carrying the first RSC, the method further includes: the first terminal sends a security mode command request to the second terminal; the first terminal receives a security mode completion message carrying the first RSC sent by the second terminal.

Figure 9:
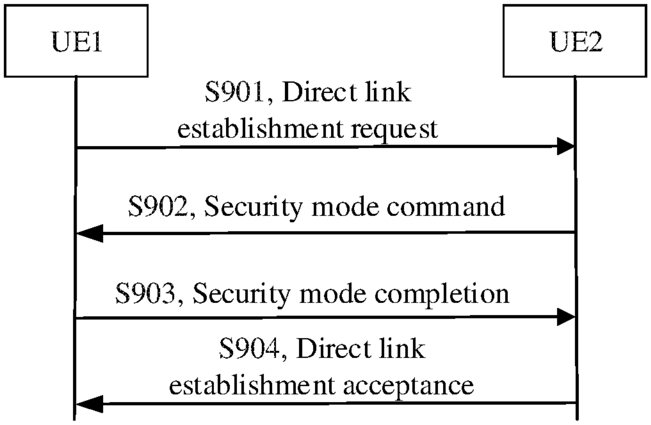
FIG. 9 is an optional flowchart of the data transmission method of an embodiment of the present disclosure.

At this time, the interaction between the first terminal and the second terminal, as shown in FIG. 9, includes the following.

In S901, a second terminal sends a direct link establishment request to a first terminal.

At this time, the first terminal receives the direct link establishment request sent by the second terminal.

In S902, the first terminal sends a security mode command to the second terminal.

In S903, the second terminal sends a security mode completion to the first terminal.

In S904, the first terminal sends a direct link establishment acceptance to the second terminal.

Here, S902 is used for the first terminal to interact security parameters with the second terminal.

The security mode completion sent in S903 uses security protection based on security parameters.

In an embodiment of the present disclosure, the first message of sending the first RSC and the first message of sending the PDU type may be the same message or different messages.

In an example, the direct link establishment request received by the first terminal carries the first RSC and the PDU type.

In an example, the direct link establishment request received by the first terminal carries the first RSC, and the received security mode completion carries the PDU type.

In some embodiments, the first terminal establishes the PDU session corresponding to the PDU session type.

Here, when the first terminal determines the PDU session type and determines that the first terminal does not establish a corresponding PDU session, the PDU session corresponding to the PDU session type is established, and the established PDU session corresponds to the PC5 connection between the first terminal and the second terminal. When the first terminal determines the PDU session type and detects that the first terminal has established the PDU session corresponding to the PDU session type, the PDU session corresponds to the PC5 connection between the first terminal and the second terminal.

In some embodiments, the PDU session type is one of: IPv4, IPv6, IPv4v6, Ethernet, and Unstructured.

Taking the PDU session parameters including the PDU session type information as an example, if the PDU session type information indicates that the PDU session type is IPv4, then the PDU session type is IPv4; if the PDU session type information indicates that the PDU session type is IPv6, then the PDU session type is IPv6; or if the PDU session type information indicates that the PDU session type is IPv4v6, then the PDU session type includes IPv4 and IPv6.

In some embodiments, in response to the PDU session type being IPv4v6, the PDU session includes:

a first PDU session of a PDU session type IPv4 and a second PDU session of a PDU session type IPv6.

In some embodiments, connections between the first terminal and the second terminal include the following.

A first connection corresponding to IPv4 and a second connection corresponding to IPv6, the first PDU session is used to transmit data of the first connection, and the second PDU session is used to transmit data of the second connection.

In an embodiment of the present disclosure, if the PDU session type information indicates IPv4v6, it is necessary to correspond to two PC5 connections, each of which corresponds to IPv4 and IPv6 respectively. The two PC5 connections interact with the same RSC in connection establishment, but the IP capabilities of the interaction are different. The first terminal needs to correspond to IPv4v6 or two PDU sessions of IPv4+IPv6. If the first terminal does not support IPv4v6, the first terminal corresponds to two sessions: the PDU session of IPv4 and the PDU session of IPv6, and the PC5 connection of IPv4 corresponds to the PDU session of IPv4, and the PC5 connection of IPv6 corresponds to the PDU session of IPv6.

Taking the first terminal being the relay UE and the second terminal being the remote UE as an example, the data transmission method provided by embodiments of the present disclosure will be further described below.

First Instance

Figure 10:
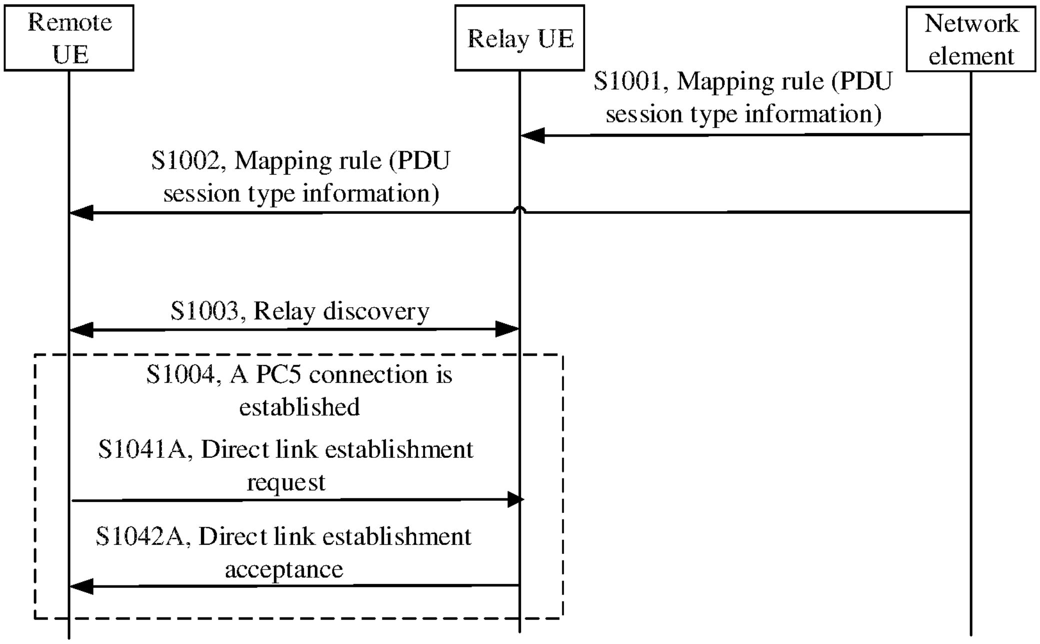
FIG. 10 is an optional flowchart of the data transmission method of an embodiment of the present disclosure.
Figure 11:
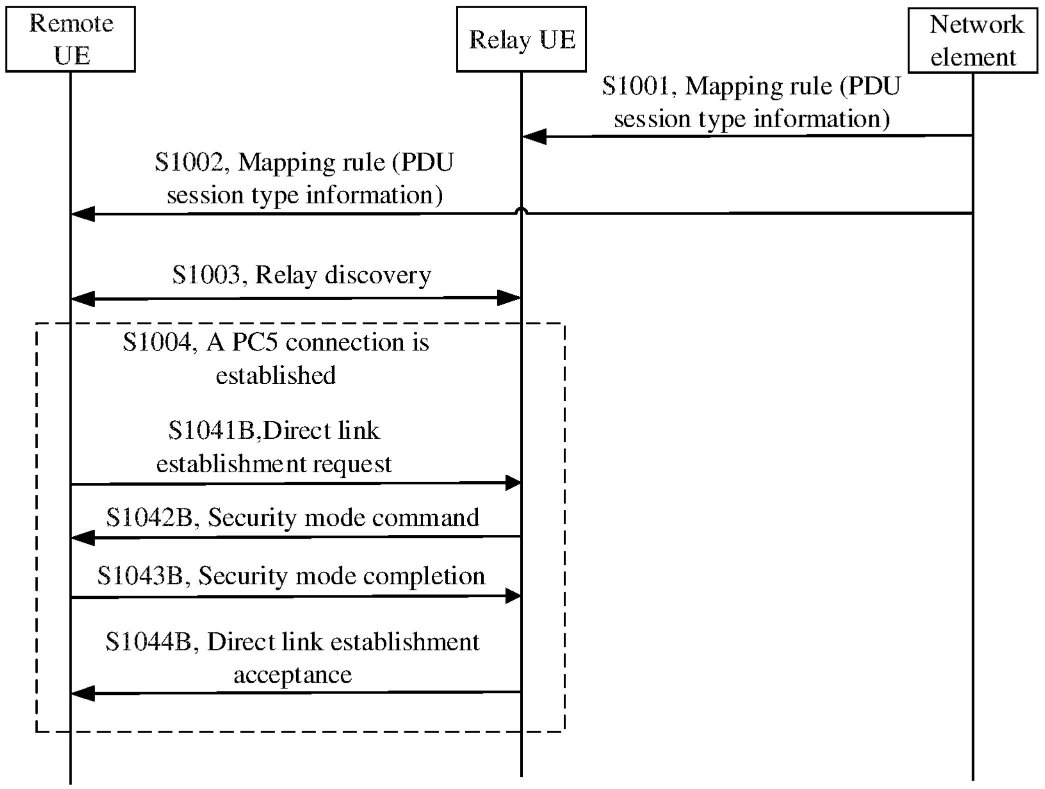
FIG. 11 is an optional flowchart of the data transmission method of an embodiment of the present disclosure.

As shown in FIGS. 10 and 11, the method includes the following.

In S1001, a remote UE receives a mapping rule related to a UE-to-network (N2 W) relay from a network element.

The mapping rule includes a PDU session type.

In S1002, a relay UE receives a mapping rule related to an N2 W relay from the network element.

The mapping rule includes the PDU session type.

In S1001 and S1002, the mapping rule received by the remote UE and the relay UE from the network element includes: a mapping relationship between RSC and PDU session parameters, here the mapping relationship must contain PDU session type information, and the PDU session type has only one type value. The session type indicated by the PDU session type may be any of IPv4, IPv6, IPv4v6, Ethernet, and Unstructured.

The network element may be PCF, application server, or may be terminal local configuration or SIM card.

In an example, the mapping rule may be carried in a proximity strategy sent by the network element to the remote UE. This mapping rule may be understood as a RSC-PDU session parameter mapping rule.

In S1003, the relay UE and the remote UE perform relay discovery.

An application layer of the remote UE indicates that a prose layer needs a certain RSC, and then discovers a relay UE that supports the RSC. Here, the way of relay discovery may be Model A or Model B.

In S1004, the relay UE establishes a PC5 connection with the remote UE.

If the RSC may does not have security concerns and may use signaling transmission without security inclusion, then as shown in FIG. 10, S1004 includes the following.

In S1041A, the remote UE sends a direct link establishment request to the relay UE.

Here, the direct link establishment request contains a relay UE ID. Since the relay UE may support a plurality of RSCs, the direct link establishment request contains the RSC.

In S1042A, the relay UE sends a direct link establishment acceptance to the remote UE.

If the RSC has security concerns, as shown in FIG. 11, S1004 includes the following.

In S1041B, the remote UE sends a direct link establishment request to the relay UE.

Here, the direct link establishment request contains a relay UE ID.

In S1042B, the relay UE sends a security mode command to the remote UE.

In S1043B, the remote UE sends the security mode complete to the relay UE.

The remote UE sends the RSC to the relay UE using the security mode complete of security protection.

In S1044B, the relay UE sends a direct link establishment acceptance to the remote UE.

In FIG. 11, the relay UE and the remote UE obtain the security parameters through the interaction of S1042B and S1043B.

In first instance, the relay UE and the remote UE have the same mapping relationship, and the RSC has its corresponding PDU session type. The relay UE may determine what type of PDU session the PC5 connection should correspond to through the received RSC and the mapping relationship. For example, if RSC 1 corresponds to IPv4, the relay UE looks for a PDU session of IPv4 to transmit data for that PC5 connection.

If the PDU session type corresponding to the RSC is IPv4v6, this RSC needs to correspond to two PC5 connections, each of which corresponds to IPv4 and IPv6 respectively. The two PC5 connections interact with the same RSC in connection establishment, but the IP capabilities of the interaction are different. The relay UE needs to correspond to IPv4v6 or two PDU sessions of IPv4+IPv6 (if no, a corresponding PDU session is established).

If the PDU session type corresponding to the RSC cannot be IPv4v6, then the PC5 connection of IPv4 corresponds to the PDU session of IPv4, and the PC5 connection of IPv6 corresponds to the PDU session of IPv6.

In first instance, the relay UE may definitely find the correct PDU session through the PDU session type corresponding to the RSC, thus ensuring the correct data transmission.

Second Instance

Figure 12:
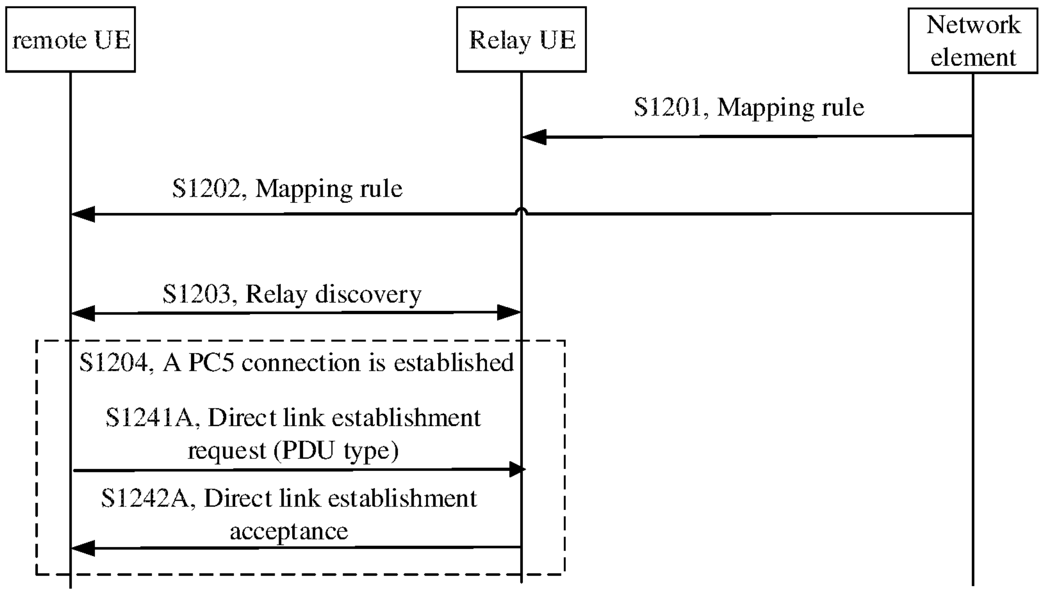
FIG. 12 is an optional flowchart of the data transmission method of an embodiment of the present disclosure.
Figure 13:
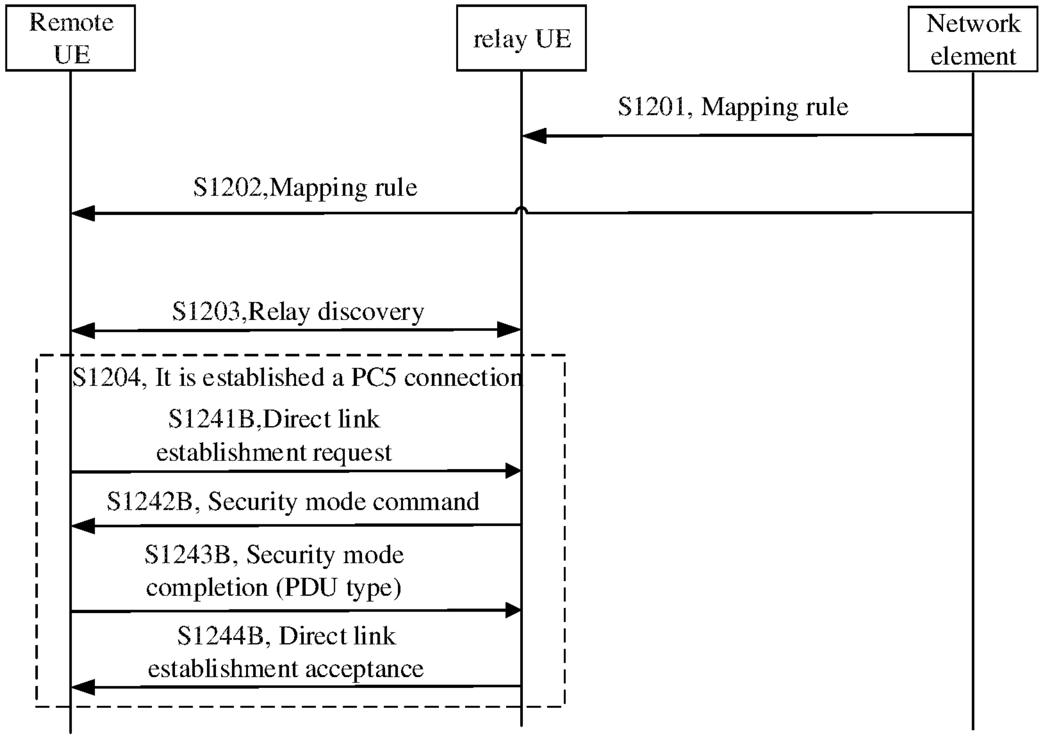
FIG. 13 is an optional flowchart of the data transmission method of an embodiment of the present disclosure.

As shown in FIGS. 12 and 13, the method includes the following.

In S1201, a relay UE receives a mapping rule related to an N2 W relay from a network element.

The mapping rule includes or does not include a PDU session type.

In S1202, a relay UE receives the mapping rule related to the N2 W relay from the network element.

The mapping rule includes or does not include the PDU session type.

In S1201 and S1202, the mapping rule received by the remote UE and the relay UE from the network element includes: a mapping relationship between the RSC and PDU session parameters, here the mapping relationship contains or does not contain the PDU session type, and if contains, the PDU session type has only one type value. The session type indicated by the PDU session type may be any of IPv4, IPv6, IPv4v6, Ethernet, and Unstructured.

The network element may be PCF, application server, or may be terminal local configuration or SIM card.

Optionally, the mapping rule may be carried in a proximity strategy sent by the network element to the remote UE. This mapping rule may be understood as a RSC-PDU session parameter mapping rule.

In S1203, the relay UE and the remote UE perform relay discovery.

An application layer of the remote UE indicates that a prose layer needs a certain RSC, and then discovers a relay UE that supports the RSC. Here, the way of relay discovery may be Model A or Model B.

In S1204, the relay UE establishes a PC5 connection with the remote UE.

If the RSC may does not have security concerns and may use signaling transmission without security inclusion, then as shown in FIG. 12, S1204 includes the following.

In S1241A, the remote UE sends a direct link establishment request to the relay UE.

Here, the direct link establishment request contains a relay UE ID. Since the relay UE may support a plurality of RSCs, the direct link establishment request contains the RSC. If the RSC does not have a corresponding PDU session type, the direct link establishment request may also contain the PDU type of the PC5 connection.

In S1242A, the relay UE sends a direct link establishment acceptance to the remote UE.

If the RSC has security concerns, as shown in FIG. 13, S1204 includes the following.

In S1241B, the remote UE sends a direct link establishment request to the relay UE.

Here, the direct link establishment request contains a relay UE ID.

In S1242B, the relay UE sends a security mode command to the remote UE.

In S1243B, the remote UE sends security mode complete to the relay UE.

The remote UE sends the RSC to the relay UE using the security mode complete of security protection. If the RSC does not have a corresponding PDU session type, the direct link establishment request may also contain the PDU type of the PC5 connection.

In S1244B, the relay UE sends a direct link establishment acceptance to the remote UE.

In FIG. 13, the relay UE and the remote UE obtain the security parameters through the interaction of S1242B and S1243B.

In S1204, if the relay UE has received a PDU type, the PDU type and the RSC are used to judge the corresponding PDU session type. If the PDU type is not received and the RSC has no corresponding PDU session type, the relay UE judges the PDU type of the PC5 connection through a PDU type used by its upper layer, and then judges the corresponding PDU session type by using this PDU type and the RSC.

If the above PDU type is IPv4, the corresponding PDU session type is IPv4 or IPv4v6; or if the above PDU type is IPv6, the corresponding PDU session type is IPv6 or IPv4v6.

In second instance, the relay UE judges the PDU type corresponding to the PC5 connection, and then finds the correct PDU session in combination with the RSC, thus ensuring the correct data transmission.

Preferred implementations of the present disclosure have been described above in detail in conjunction with the accompanying drawings, but the present disclosure is not limited to the specific details of the above implementations. Within the scope of the technical conception of the present disclosure, various simple modifications can be made to the technical solution of the present disclosure, and these simple modifications all belong to the scope of protection of the present disclosure. For example, each of the specific technical features described in the above specific implementations may be combined in any suitable manner without contradiction, and various possible combinations are not further described in the present disclosure in order to avoid unnecessary repetition. For another example, various different implementations of the present disclosure may be combined with each other, so long as it does not depart from the idea of the present disclosure, and is likewise to be regarded as the disclosure of the present disclosure. For another example, on the premise of no conflict, each embodiment and/or the technical features in each embodiment described in the present disclosure may be arbitrarily combined with the related art, and the technical solution obtained after combination should also fall within the scope of protection of the present disclosure.

It is also to be understood that in various method embodiments of the present disclosure, the size of the sequence number of the above processes does not mean the order of execution, and the execution order of each process should be determined according to its function and inherent logic, and should not constitute any limitation on the implementation process of embodiments of the present disclosure. Further, in embodiments of the present disclosure, the terms "downlink", "uplink" and "sidelink" are used to represent a transmission direction of a signal or data, here "downlink" is used to represent a first direction of transmission of the signal or data from a site to a user equipment of a cell; "uplink" is used to represent a second direction of transmission of the signal or data from the user equipment of the cell to the site; and "side line" is used to represent a third direction of transmission of the signal or data from a user equipment 1 to a user equipment 2. For example, "downlink signal" represents that the transmission direction of the signal is the first direction. In addition, the term "and/or" in embodiments of the present disclosure is merely an association relationship that describes associated objects, representing that there can be three relationships. Specifically, A and/or B may represent three conditions: independent existence of A, existence of both A and B and independent existence of B. In addition, the character "I" herein generally represents that the related objects in the context are a kind of "or" relationship.

Figure 14:
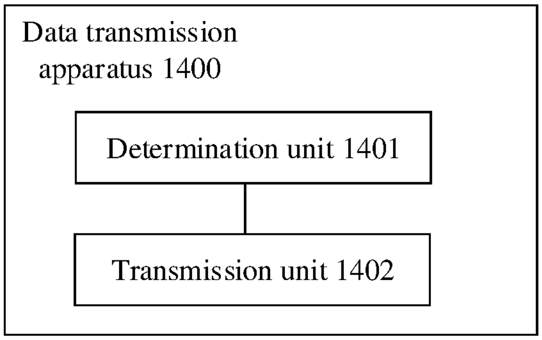
FIG. 14 is an optional structure schematic diagram of a data transmission apparatus of an embodiment of the present disclosure.

An embodiment of the present disclosure further provides a data transmission apparatus 1400, as shown in FIG. 14, is applied to a first terminal and includes a determination unit 1401 and a transmission unit 1402.

The determination unit 1401 is configured to determine a PDU session type.

The transmission unit 1402 is configured to transmit data between a network device and a second terminal based on a PDU session corresponding to the PDU session type.

In some embodiments, the determination unit 1401 is further configured to determine the PDU session type based at least on a first mapping rule corresponding to a first RSC. The first RSC is an RSC corresponding to the second terminal.

In some embodiments, the first mapping rule is configured by a network device for the first terminal; pre-configured by the first terminal; or pre-stored by the first terminal.

In some embodiments, the determination unit 1401 is further configured to determine the first RSC based on a first message sent by the second terminal.

In some embodiments, the first mapping rule indicates correspondences between the first RSC and PDU session parameters.

In some embodiments, the PDU session parameters indicated by the first mapping rule are used to determine the PDU session type.

In some embodiments, the determination unit 1401 is further configured to determine the PDU session type based on PDU session type information included in the PDU session parameters.

In some embodiments, the PDU session type information indicates one PDU session type.

In some embodiments, the first mapping rule is the same as a second mapping rule, and the second mapping rule is a mapping rule for the second terminal and corresponds to the first RSC.

In some embodiments, the first mapping rule is configured by the network device for the first terminal; and the second mapping rule is configured by the network device for the second terminal.

In some embodiments, the determination unit 1401 is further configured to determine the PDU session type based on a PDU type and at least on one of the following information in the PDU session parameters: S-NSSAI, DNN and SSC mode.

In some embodiments, the apparatus 1400 further includes the following.

A sending unit, which is configured to determine the PDU type based on the first message sent by the second terminal; or A type determining unit, which is configured to determine the PDU type based on a PDU type used by an upper layer of the first terminal.

In some embodiments, the first message includes one of:

a direct link establishment request.

a security mode completion message.

In some embodiments, the apparatus 1400 further includes a receiving unit.

The receiving unit is configured to receive the direct link establishment request carrying or not carrying the first RSC sent by the second terminal.

In some embodiments, in response to the first RSC having no security requirement, the direct link establishment request carries the first RSC; or in response to the first RSC having a security requirement, the direct link establishment request does not carry the first RSC.

In some embodiments, the apparatus 1400 further includes a sending unit and a receiving unit.

The sending unit is configured to send a security mode command request to the second terminal.

The receiving unit is further configured to receive the security mode completion message carrying the first RSC sent by the second terminal.

In some embodiments, the apparatus 1400 further includes: an establishment unit, which is configured to establish the PDU session corresponding to the PDU session type.

In some embodiments, the PDU session type is one of: Internet Protocol Version 4 (IPv4), Internet Protocol Version 6 (IPv6), IPv4v6, Ethernet, or Unstructured.

In some embodiments, in response to the PDU session type being IPv4v6, the PDU session includes:

a first PDU session of a PDU session type IPv4 and a second PDU session of a PDU session type IPv6.

In some embodiments, connections between the first terminal and the second terminal include:

a first connection corresponding to IPv4 and a second connection corresponding to IPv6, the first PDU session is used to transmit data of the first connection, and the second PDU session is used to transmit data of the second connection.

Figure 15:
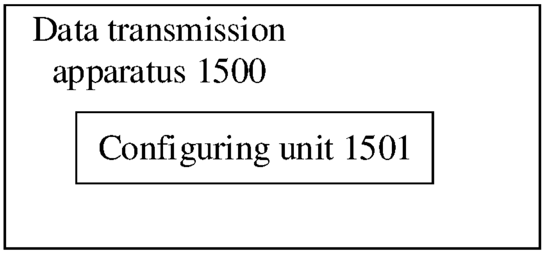
FIG. 15 is an optional structure schematic diagram of the data transmission apparatus of an embodiment of the present disclosure.

An embodiment of the present disclosure further provides a data transmission apparatus, which is applied to a network device and as shown in FIG. 15, includes a configuring unit 1501.

The configuring unit 1501 is configured to configure a first mapping rule for a first terminal; the first mapping rule is used to indicate PDU session parameters, PDU session type information in the PDU session parameters is used for the first terminal to determine a PDU session type, a PDU session corresponding to the PDU session type is used to transmit data between the first terminal and a second terminal, and a first RSC corresponding to the first mapping rule is an RSC corresponding to the second terminal.

In some embodiments, the first mapping rule indicates correspondences between the first RSC and PDU session parameters.

In some embodiments, the PDU session type information indicates one PDU session type.

In some embodiments, the first mapping rule is the same as a second mapping rule, and the second mapping rule is a mapping rule for the second terminal and corresponds to the first RSC.

In some embodiments, the configuring unit 1501 is further configured to configure the second mapping rule for the second terminal.

In some embodiments, the PDU session parameters further include at least one of:

a single network slice selection assistance information (S-NSSAI), a data network name (DNN), or a session and service continuity (SSC) mode.

In some embodiments, the PDU session type includes one of: Internet Protocol Version 4 (IPv4), Internet Protocol Version 6 (IPv6), IPv4v6, Ethernet, or Unstructured.

In some embodiments, in response to the PDU session type being IPv4v6, the PDU session includes:

a first PDU session of a PDU session type IPv4 and a second PDU session of a PDU session type IPv6.

In some embodiments, connections between the first terminal and the second terminal include the following.

A first connection corresponding to IPv4 and a second connection corresponding to IPv6, the first PDU session is used to transmit data of the first connection, and the second PDU session is used to transmit data of the second connection.

It is to be understood by those skilled in the art that the above-mentioned related description of the data transmission apparatus of embodiments of the present disclosure may be understood with reference to the related description of the data transmission method of embodiments of the present disclosure.

Figure 16:
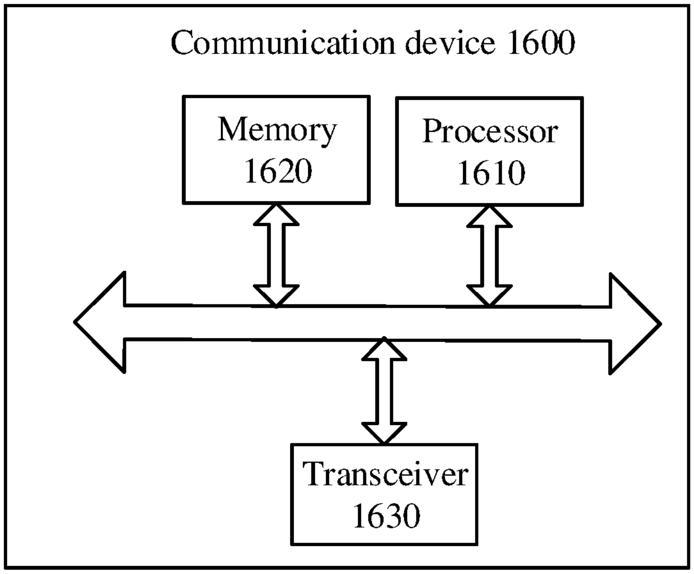
FIG. 16 is an optional structure schematic diagram of a communication device provided by an embodiment of the present disclosure.

FIG. 16 is a schematic structural diagram of a communication device 1600 provided by an embodiment of the present disclosure. The communication device may be a terminal device or a network device. The communication device 1600 shown in FIG. 16 includes a processor 1610 that may invoke and run a computer program from a memory to implement the method in embodiments of the present disclosure.

In an example, as shown in FIG. 16, the communication device 1600 may also include a memory 1620. Here, the processor 1610 may invoke and run a computer program from the memory 1620 to implement the method in embodiments of the present disclosure.

Here, the memory 1620 may be a separate component independent of the processor 1610 or may be integrated in the processor 1610.

Optionally, as shown in FIG. 16, the communication device 1600 may also include a transceiver 1630 that may be controlled by the processor 1610 to communicate with other devices, and in particular may transmit information or data to or receive information or data transmitted by other devices.

Here, the transceiver 1630 may include a transmitter and a receiver. The transceiver 1630 may further include antennas, the number of which may be one or more.

Optionally, the communication device 1600 may be specifically the network device of embodiments of the present disclosure, and the communication device 1600 may implement corresponding processes implemented by the network device in various methods of embodiments of the present disclosure, which will not be repeated here for the sake of brevity.

Optionally, the communication device 1600 may be specifically the mobile terminal/terminal device of embodiments of the present disclosure, and the communication device 1600 may implement corresponding processes implemented by the mobile terminal/terminal device in various methods of embodiments of the present disclosure, which will not be repeated here for the sake of brevity.

Figure 17:
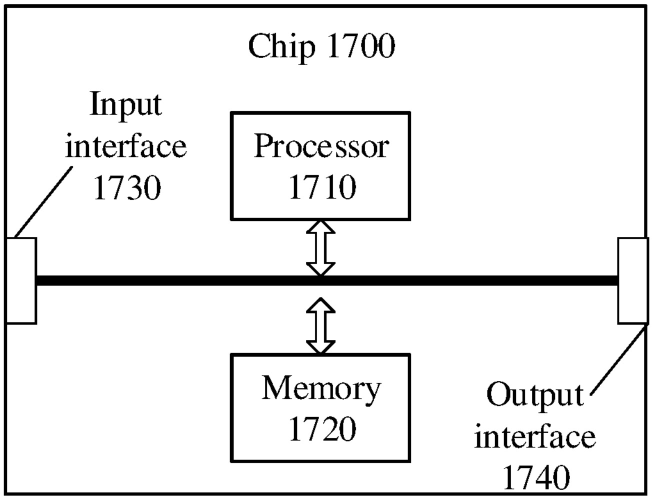
FIG. 17 is an optional structure schematic diagram of a chip of an embodiment of the present disclosure.

FIG. 17 is a schematic structural diagram of a chip of an embodiment of the present disclosure. The chip 1700 shown in FIG. 17 includes a processor 1710 that may invoke and run a computer program from a memory to implement the method in embodiments of the present disclosure.

Optionally, as shown in FIG. 17, the chip 1700 may also include a memory 1720. Here, the processor 1710 may invoke and run a computer program from the memory 1720 to implement the method in embodiments of the present disclosure.

Here, the memory 1720 may be a separate component independent of the processor 1710 or may be integrated in the processor 1710.

Optionally, the chip 1700 may also include an input interface 1730. Here, the processor 1710 may control the input interface 1730 to communicate with other devices or chips, and in particular may obtain information or data transmitted by other devices or chips.

Optionally, the chip 1700 may also include an output interface 1740. Here, the processor 1710 may control the output interface 1740 to communicate with other devices or chips, and in particular may output information or data to other devices or chips.

Optionally, the chip may be applied on the mobile terminal/terminal device of embodiments of the present disclosure, and the chip may implement corresponding processes implemented by the mobile terminal/terminal device in various methods of embodiments of the present disclosure, which will not be repeated here for the sake of brevity.

It is to be understood that the chip referred to in embodiments of the present disclosure may also be referred to as system level chip, system on chip, chip system, system-on-chip or the like.

Figure 18:
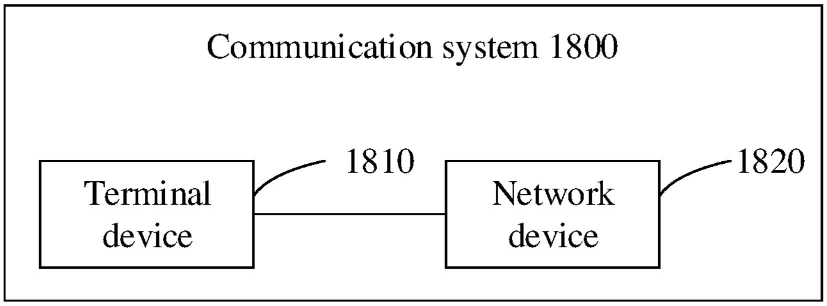
FIG. 18 is a schematic block diagram of a communication system provided by an embodiment of the present disclosure.

FIG. 18 is a schematic block diagram of a communication system 1800 provided by an embodiment of the present disclosure. As shown in FIG. 18, the communication system 1800 includes a terminal device 1810 and a network device 1820.

Here, the terminal device 1810 may be used to implement the corresponding functions implemented by the terminal device in the above-mentioned method, and the network device 1820 may be used to implement the corresponding functions implemented by the network device in the above-mentioned method, which will not be repeated here for the sake of brevity. For the sake of brevity, it will not be repeated here.

It is to be understood that the processor of embodiments of the present disclosure may be an integrated circuit chip with signal processing capability. In the process of implementation, the various steps of embodiments of the above-mentioned method may be completed by integrated logic circuitry of hardware in the processor or instructions in the form of software. The above-mentioned processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components. The various methods, steps and logic block diagrams disclosed in embodiments of the present disclosure may be implemented or performed. The general purpose processor may be a microprocessor or the processor may also be any conventional processor or the like. The steps of the method disclosed in combination with embodiments of the present disclosure may be directly embodied as the execution of the hardware decoding processor or the combined execution of the hardware and software modules in the decoding processor. The software modules may be located in random access memory, flash memory, read-only memory, programmable read-only memory or electrically erasable programmable memory, registers and other storage media mature in the art. The storage medium is located in the memory, and the processor reads the information in the memory and completes the steps of the above-mentioned method in combination with its hardware.

It is understood that the memory in embodiments of the present disclosure may be a volatile memory or a non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. By way of illustration, but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory of the system and method described herein is intended to include but not limited to these and any other suitable types of memory.

It is to be understood that the above-mentioned memory are illustration but not limitation. For example, the memory of embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and Direct Rambus RAM (DR RAM), etc. That is to say, the memory of embodiments of the present disclosure is intended to include but not limited to these and any other suitable types of memory.

Embodiments of the present disclosure further provide a computer-readable storage medium used to store a computer program.

In an example, the computer readable storage medium may be applied on the network device of embodiments of the present disclosure, and the computer program causes the computer to perform corresponding processes implemented by the network device in various methods of embodiments of the present disclosure, which will not be repeated here for the sake of brevity.

In an example, the computer readable storage medium may be applied on the mobile terminal/terminal device of embodiments of the present disclosure, and the computer program causes the computer to perform corresponding processes implemented by the mobile terminal/terminal device in various methods of embodiments of the present disclosure, which will not be repeated here for the sake of brevity.

Embodiments of the present disclosure further provide a computer program product including computer program instructions.

In an example, the computer program product may be applied on the network device of embodiments of the present disclosure, and the computer program instructions cause the computer to perform corresponding processes implemented by the network device in various methods of embodiments of the present disclosure, which will not be repeated here for the sake of brevity.

In an example, the computer program product may be applied on the mobile terminal/terminal device of embodiments of the present disclosure, and the computer program instructions cause the computer to perform corresponding processes implemented by the mobile terminal/terminal device in various methods of embodiments of the present disclosure, which will not be repeated here for the sake of brevity.

Embodiments of the present disclosure further provide a computer program.

In an example, the computer program may be applied on the network device of embodiments of the present disclosure, and when running on a computer, the computer program causes the computer to perform corresponding processes implemented by the network device in various methods of embodiments of the present disclosure, which will not be repeated here for the sake of brevity.

In an example, the computer program may be applied on the mobile terminal/terminal device of embodiments of the present disclosure, and when running on a computer, the computer program causes the computer to perform corresponding processes implemented by the mobile terminal/terminal device in various methods of embodiments of the present disclosure, which will not be repeated here for the sake of brevity.

Those ordinary skilled in the art will appreciate that the various example units and algorithm steps described in connection with embodiments disclosed herein can be implemented in electronic hardware or a combination of computer software and electronic hardware. Whether these functions are performed in hardware or software depends on the specific application and design constraints of the technical solution. Those skilled in the art may use different methods for each particular application to implement the described function, but such implementation should not be considered beyond the scope of the present disclosure.

Those skilled in the art will clearly appreciate that, for convenience and brevity of description, the specific operating processes of the above-described systems, apparatuses and units may refer to the corresponding processes in the aforementioned method embodiments and will not be repeated herein.

In several embodiments provided by the present disclosure, it is to be understood that the disclosed systems, apparatuses and methods may be implemented in other ways. For example, the above-described apparatus embodiments are only schematic, for example, the division of the unit is only a logical function division, and in practice, there may be other division modes. For example, a plurality of units or components may be combined or integrated into another system, or some features may be ignored or not performed. On the other hand, the coupling or direct coupling or communication connection between each other shown or discussed may be indirect coupling or communication connection through some interfaces, apparatuses or units, and may be electrical, mechanical or other form.

The units illustrated as separate components may be or may not be physically separated, and the components displayed as units may be or may not be physical units, i.e. may be located in one place, or may be distributed over a plurality of network units. Part or all of the units may be selected according to the actual needs to achieve the purpose of the solution of the present embodiments.

In addition, each functional unit in each embodiment of the present disclosure may be integrated in one processing unit, may exist physically alone, or two or more units may be integrated in one unit.

The functions may be stored in a computer readable storage medium if implemented in the form of software functional units and sold or used as stand-alone products. Based on such understanding, the technical solution of the present disclosure essentially, or the part that contributes to the prior art, or the part of the technical solution, may be embodied in the form of a software product. This computer software product is stored in a storage medium and includes several instructions for causing a computer device (which may be a personal computer, a server, or a network device, etc.) to perform all or part of the steps of the method described in various embodiments of the present disclosure. The aforementioned storage medium includes a U disk, a removable hard disk, a Read-Only Memory (ROM), a Random Access Memory (RAM), a magnetic disk or an optical disk and other medium capable of storing program codes.

The above is only specific implementation of the present disclosure, but the scope of protection of the present disclosure is not limited thereto. Any changes or substitutions can be easily conceived within the technical scope disclosed in the present disclosure by those skilled in the art who are familiar with the technical field should be covered within the protection scope of the present disclosure. Therefore, the protection scope of the present disclosure shall be subject to the protection scope of the claims.

What is claimed is:

1. A data transmission method, comprising:

receiving, by a first terminal, a direct link establishment request sent by a second terminal, wherein the direct link establishment request carries a first relay service code RSC);

determining, by the first terminal, a protocol data unit (PDU) session type based on at least a first mapping rule corresponding to the first RSC, the first RSC being an RSC sent by the second terminal; and relaying, by the first terminal, data between the second terminal and a network device based on a PDU session corresponding to the PDU session type;

wherein the first mapping rule indicates correspondences between the first RSC and PDU session parameters, and the PDU session type is one of: Internet Protocol Version 4 (IPv4), Internet Protocol Version 6 (IPv6), IPv4v6, Ethernet, or Unstructured, wherein determining, by the first terminal, the PDU session type based on at least the first mapping rule corresponding to the first RSC comprises:

determining, by the first terminal, the PDU session type based on a PDU type and at least one of the PDU session parameters comprising: a single network slice selection assistance information (S-NSSAI), a data network name (DNN), or a session and service continuity (SSC) mode.

2. The method of claim 1, wherein the first mapping rule is configured by a network device for the first terminal; the first mapping rule is pre-configured by the first terminal; or the first mapping rule is pre-stored by the first terminal.

3. The method of claim 1, wherein the PDU session parameters indicated by the first mapping rule are used to determine the PDU session type.

4. The method of claim 1, wherein the PDU session parameters comprise: PDU session type information, and determining, by the first terminal, the PDU session type based on at least the first mapping rule corresponding to the first RSC comprises:

determining, by the first terminal, the PDU session type based on the PDU session type information.

5. The method of claim 4, wherein the PDU session type information indicates a PDU session type.

6. The method of claim 4, wherein the first mapping rule is the same as a second mapping rule, the second mapping rule is a mapping rule for the second terminal, and the second mapping rule corresponds to the first RSC, wherein the first mapping rule is configured by the network device for the first terminal; and the second mapping rule is configured by the network device for the second terminal.

7. The method of claim 1, further comprising:

establishing, by the first terminal, the PDU session corresponding to the PDU session type.

8. A first terminal, comprising a memory used to store a computer program, and a processor configured invoke and run the computer program stored in the memory to control the first terminal to:

receive a direct link establishment request sent by a second terminal, wherein the direct link establishment request carries a first relay service code (RSC);

determine a protocol data unit (PDU) session type based on at least a first mapping rule corresponding to the first RSC, the first RSC being an RSC sent by the second terminal;

relay data between a network device and the second terminal based on a PDU session corresponding to the PDU session type, wherein the first mapping rule indicates correspondences between the first RSC and PDU session parameters, and the PDU session type is one of: Internet Protocol Version 4 (IPv4), Internet Protocol Version 6 (IPv6), IPV4v6, Ethernet, or Unstructured, wherein the processor is further configured to invoke and run the computer program stored in the memory to control the first terminal to determine the PDU session type based on a PDU type and at least one of the PDU session parameters comprising: a single network slice selection assistance information (S-NSSAI), a data network name (DNN), or a session and service continuity (SSC) mode.

9. The first terminal of claim 8, wherein the first mapping rule is configured by a network device for the first terminal; the first mapping rule is pre-configured by the first terminal; or the first mapping rule is pre-stored by the first terminal.

10. The first terminal of claim 8, wherein the PDU session parameters comprise: PDU session type information, and the processor is further configured to invoke and run the computer program stored in the memory to control the first terminal to:

determine the PDU session type based on the PDU session type information.

11. The first terminal of claim 10, wherein the PDU session type information indicates a PDU session type.

12. The first terminal of claim 10, wherein the first mapping rule is the same as a second mapping rule, the second mapping rule is a mapping rule for the second terminal, and the second mapping rule corresponds to the first RSC, wherein the first mapping rule is configured by the network device for the first terminal; and the second mapping rule is configured by the network device for the second terminal.

13. The first terminal of claim 8, wherein the processor is configured to invoke and run the computer program stored in the memory to:

establish the PDU session corresponding to the PDU session type.

14. A data transmission apparatus, comprising a memory used to store a computer program, and a processor used to invoke and run the computer program stored in the memory to control the data transmission apparatus to:

configure a first mapping rule for a first terminal; the first mapping rule being used to indicate protocol data unit (PDU) session parameters, a PDU type and at least one of the PDU session parameters comprising a single network slice selection assistance information (S-NSSAI), a data network name (DNN), or a session and service continuity (SSC) mode, the PDU type and the at least one of the PDU session parameters being used for the first terminal to determine a PDU session type, a PDU session corresponding to the PDU session type being used to relay data between the first terminal and a second terminal, and a first relay service code (RSC) corresponding to the first mapping rule being an RSC sent by the second terminal, wherein the first RSC is carried in a direct link establishment request sent to the first terminal by the second terminal;

wherein the first mapping rule indicates correspondences between the first RSC and the PDU session parameters, wherein the PDU session type is one of: Internet Protocol Version 4 (IPv4), Internet Protocol Version 6 (IPv6), IPv4v6, Ethernet, or Unstructured.

* * * * *